United States Patent [19]

Roast

[11] Patent Number: 4,636,165
[45] Date of Patent: Jan. 13, 1987

[54] STRIPPER RINGS FOR CAPSULE PINS

[75] Inventor: William G. Roast, Basingstoke, England

[73] Assignee: Lilly Industries Limited, London, England

[21] Appl. No.: 795,959

[22] Filed: Nov. 7, 1985

[30] Foreign Application Priority Data

Nov. 14, 1984 [GB] United Kingdom ............. 8428750

[51] Int. Cl.[4] .................. B29C 45/17; B29C 47/68
[52] U.S. Cl. ................................ 425/472; 425/274
[58] Field of Search ........................... 425/274, 472

[56] References Cited

U.S. PATENT DOCUMENTS

Re. 30,654  6/1981  Dittman et al. ............. 425/274
4,260,357  4/1981  Roast et al. ................ 425/274

Primary Examiner—Willard E. Hoag
Attorney, Agent, or Firm—Houston L. Swenson

[57] ABSTRACT

A ring for stripping capsule sections from a tapered capsule-forming pin has an annular outer member 11 with a tapered surface 12 engaging tapered surfaces 13 on four angularly spaced sections 14 forming an inner member and with inner surfaces 15 defining a bore slidable on the pin. A spring plate 60 is held in groove 62 in member 11 and bears on an end face of the sections 14 to hold the sections in engagement with the pin and resist radially outwards movement of the sections 14 when they engage the capsule section. In modified arrangements the plate 60 embraces the member 11 and engages an end face of the sections 14; and the plate 60 is replaced by a spring clip embracing the sections 14 which extend beyond the member 11.

9 Claims, 17 Drawing Figures

U.S. Patent   Jan. 13, 1987   Sheet 1 of 4   4,636,165
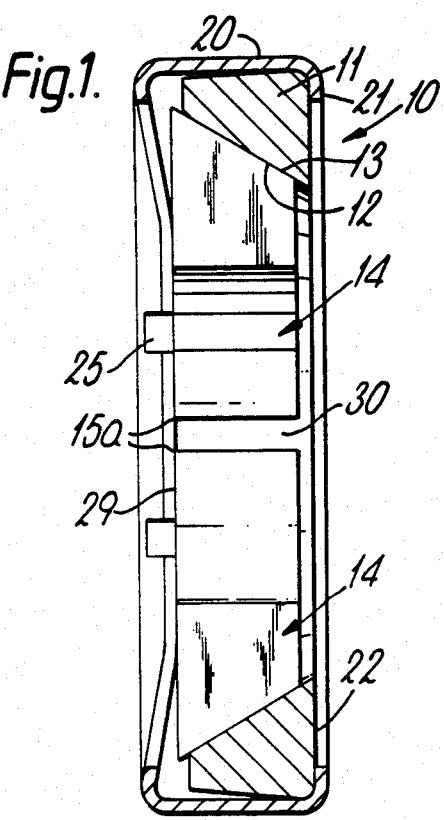
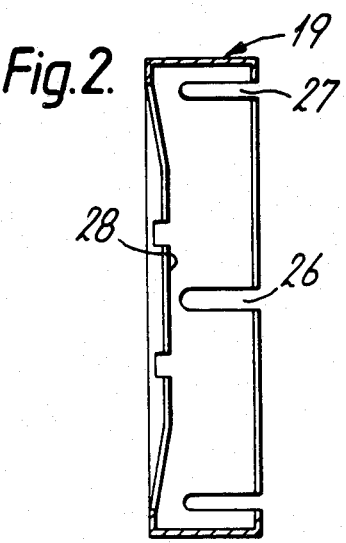
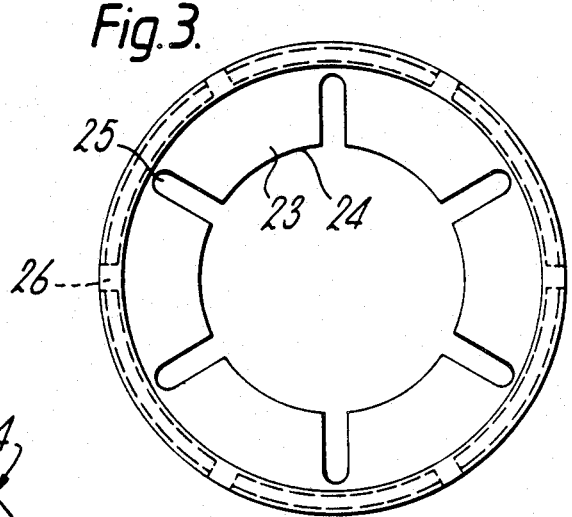
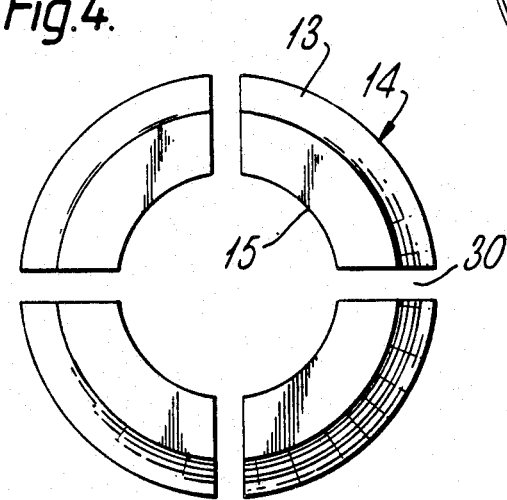

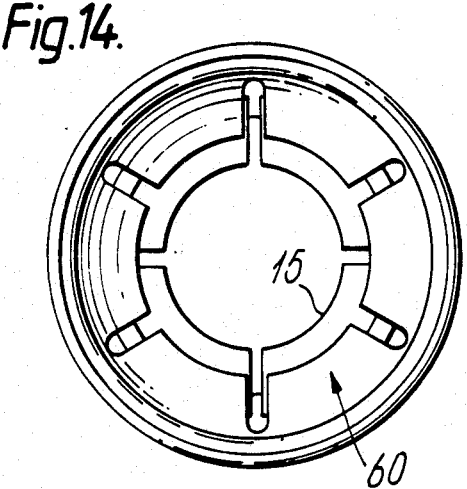
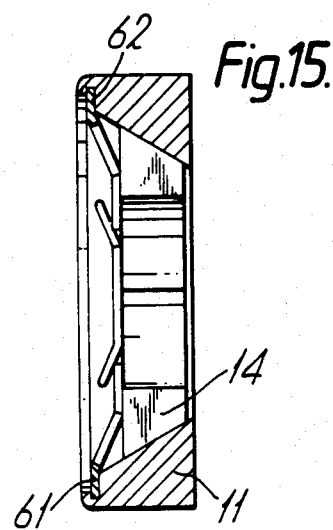
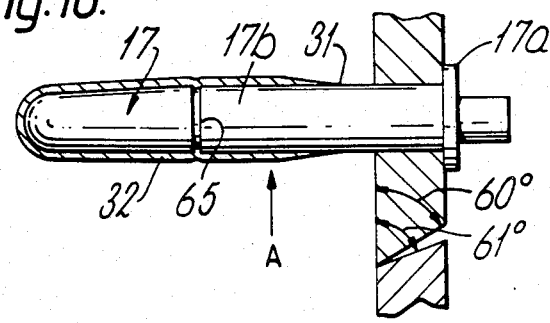
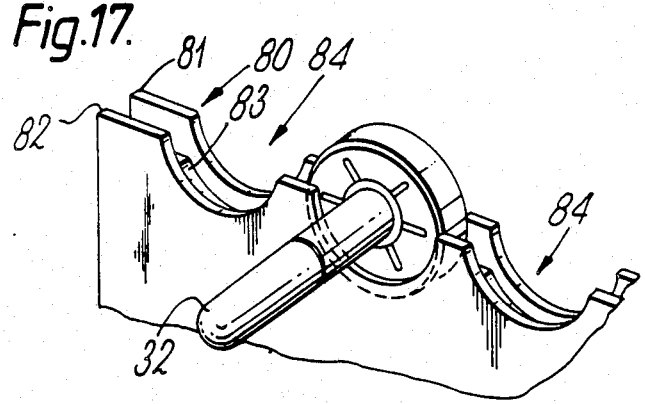

STRIPPER RINGS FOR CAPSULE PINS

This invention related to stripper rings for capsule pins.

Many pharmaceutical capsules comprise two sections (cap and body) fitted together with the cap partly overlapping the body to form a closed container for the pharmaceutical preparation.

The production of capsules and capsule sections involves the use of metal pins which are dipped into molten gelatin. The pins are passed through kilns giving a controlled drying so that the gelatin is allowed to dry and set, and the capsule cap or body section is then removed from the pin. The pins are formed from a material such as stainless steel and are slightly tapered throughout their length to enable the capsule cap or body to be more readily stripped from the pin. The capsule cap and body sections are usually moulded with formations which cooperate, when the sections are fitted together, to resist axial separation of the sections.

In conventional apparatus the stripping is performed by using stripping jaws. The pins are encircled by the stripping jaws which are actuated to clamp on to the pin and are then moved axially to strip the capsule section off the pin. Such a system is subject to considerable wear since the jaws are in continual operation, being brought into action as each pin is presented. There is also the possibility of misalignment of the jaws leading to tears in the capsules or "jaw holes" which are tiny holes in the capsule sections which result in leaks from the capsules when the capsules are filled.

One arrangement which seeks to overcome the difficulties inherent in the use of stripper jaws is described in U.S. Pat. No. 4,260,357 in which each pin has its own stripper ring that encircles the capsule-forming pin and is normally positioned at the upper end of the capsule pin. The ring is made of a plastics material and uses a metal insert in a portion of its bore for gripping the capsule section and moving it off the pin. Because the pin is tapered it is essential that the inner diameter of the stripper ring is variable as it is moved along the pin to eject a capsule section. Thus the ring is axially split to assume a slightly biased state throughout its travel along the length of the pin. In practice a strong clip is required to transmit adequate bias through the plastics material. The spring clip although having a degree of resilience is also relatively stiff. There is considerable frictional resistance to reverse movement of the ring because of the effect of the clip. Further, for maximum biasing force the gap between the ends of the spring clip is radially aligned with the axial slot in the split ring and insert; any tendency for the spring clip to move angularly from exact alignment with the slot in the ring leads to a loss of biasing force.

The present invention has been made from a consideration of the above.

According to one aspect of the invention a stripper ring for a capsule-forming pin comprises inner and outer members having cooperable surfaces shaped so that axial movement of the inner member in one sense relative to the outer member, causes radially inwards movement of the inner member, and spring means biasing the inner member radially inwards, the inner member defining an inner surface slidable on the pin and having an end face for engaging a capsule section on the pin during movement of the ring on the pin in the opposite sense.

The cooperable surfaces may be inclined outwardly as they extend in said opposite sense.

The inner member may comprise a plurality of angularly spaced separate elements each having an inner surface for engaging the pin.

The spring means may comprise an annular plate member engaging with the outer member and adapted to engage said end face of the inner member.

The plate member may have a peripheral marginal portion engaged in an inwardly facing groove in the outer member.

The plate member may be shaped to provide a rim surrounding the outer member and engaging an axial end face of the outer member further from said end face of the inner member.

The spring means may comprise a spring clip embracing the inner member, the inner member having a plurality of angularly spaced axial slots extending from an end face of the inner member, the spring clip being engageable with an end face of the outer member further from said end face of the inner member, said axial slots extending beyond the spring clip.

From another aspect the invention provides a stripper ring for a capsule-forming pin comprising two parts having cooperable surfaces, one part defining a pin-receiving bore and slidable on the pin to remove a capsule section from the pin, said cooperable surfaces being shaped to resist radially outwards movement of the one part when the one part engages the capsule section, and spring means urging the one part inwards.

The one part may comprise a plurality of angularly spaced portions.

The invention may be performed in various ways and some specific embodiments with possible modifications will now be described by way of example with reference to the accompanying drawings, in which:

FIG. 1 is a diametral sectional view of a first stripper ring showing a ring assembly enclosed by a cap, the ring assembly comprising four segments within an annular ring;

FIG. 2 is a diametral section of the cap on a smaller scale;

FIG. 3 is a front view of the cap;

FIG. 4 is a front view of the four segments of the ring assembly;

FIG. 14 is an axial view from the left of FIG. 15;

FIG. 15 is a part diametral section of a third stripper ring assembly;

FIG. 16 is an axial part section showing a pin and stripper ring; and

FIG. 17 is a perspective view showing a pin and pin mover arrangement.

Figure 5:
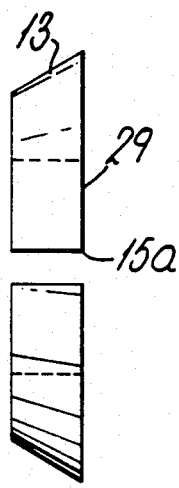
FIG. 5 is a side view of two of the segments.
Figure 6:
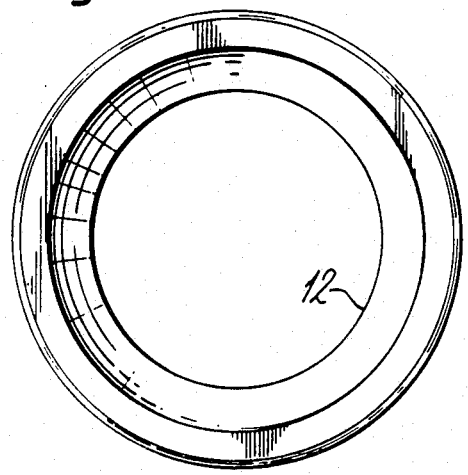
FIG. 6 is a front view of the annular ring of the ring assembly.
Figure 7:
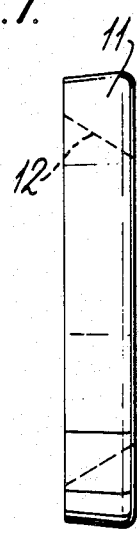
FIG. 7 is a side view of the ring.

A stripper ring 10 FIGS. 1 to 8 comprises an annular outer ring 11, for example of mild steel, having a uniformly tapering inner face 12 which slidably engages the uniformly tapered radially outer surfaces 13 of four similar part-annular wedge segments 14, for example of phosphor bronze. The four segments 14 each have an inner surface 15. The leading edges 15a of surfaces 15 are sharp. The inner surfaces 15 are nominally parallel.

An annular housing 19, for example of spring steel, holds the separate segments 14 in engagement with the ring 11 and comprises a peripheral rim 20 having an inwardly directed annular flange 21 at one end, which in the assembled conditions (FIG. 1) engages the rear face 22 of the ring 11, and at the other end has an inwardly directed annular flange 23 defining an inner edge 24 radially outwards of surfaces 15. A series of angularly spaced radial slots 25 is formed in the flange 23 and a series of axial slots 26 is formed in the rim 20 leading from the radial slots 27 in the flange 21 and located angularly midway between the slots 25. The flange 23 is bowed inwards and has an inner flat transverse surface 28 which engages the flat front faces 29 of the segments 14. The housing 19 provides an axial bias to the segments 14 and thus urges them radially inwards because of the engagement of the surfaces 12, 13.

Radial gaps 30 between adjacent segments allow the assembly to accommodate the varying diameter of tapered pin 17. The pins for forming the capsule body sections have slightly smaller diameter than those for forming the cap sections and the segments are sized appropriately for the different sized pins.

Figure 8:
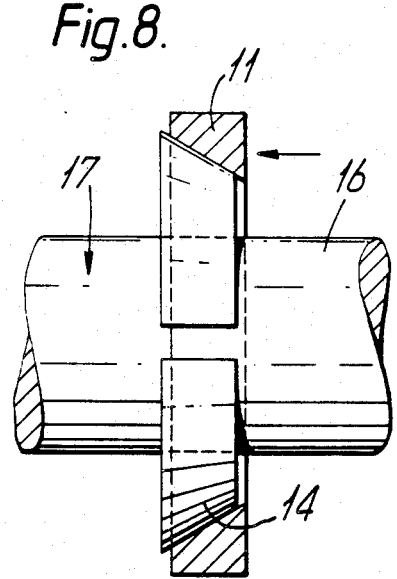
FIG. 8 is a part section view of part of the ring assembly in contact with a capsule-forming pin; the arrow indicates the direction in which the ring assembly is moved along the pin to eject a capsule section from the end of the pin.
Figure 9:
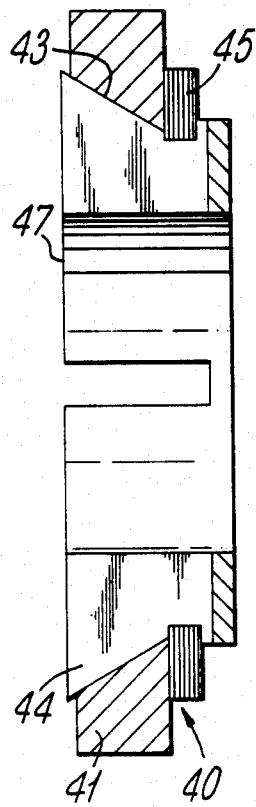
FIG. 9 is a sectional view of a second stripper ring; showing an outer ring.
Figure 10:
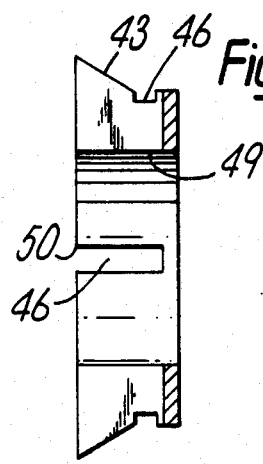
FIG. 10 is a sectional view of a tubular member of the second ring.
Figure 11:
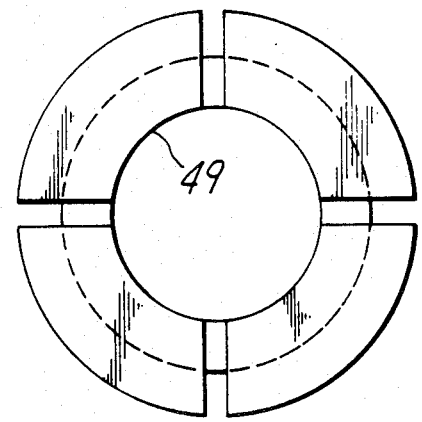
FIG. 11 is a front view of the tubular member.
Figure 12:
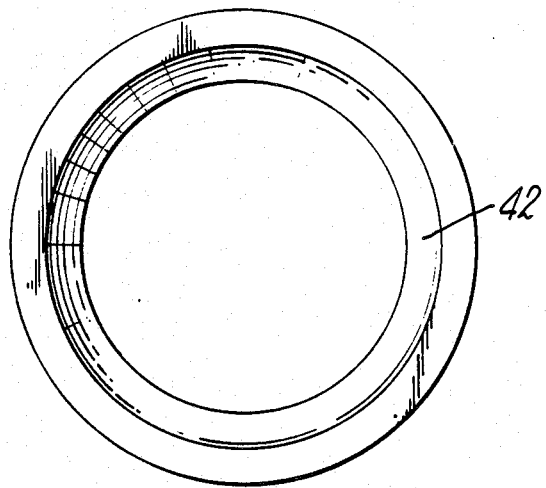
FIG. 12 is a front view of the ring.
Figure 13:
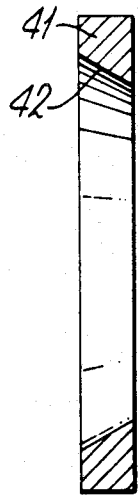
FIG. 13 is a sectional view of an outer ring of the second stripper ring.

During forward movement of the stripper ring in the direction shown in FIG. 8 to eject a capsule section off a pin the segments 14 are biased rearwards and inwards by the housing 19 and kept in contact with the pin surface 16 by cooperation with the annular ring 11. When the segments meet the end 31 of a capsule section 32 outward movement of the segments is resisted by the biassed wedge and the segments bite into the pin and bend up an end portion of the capsule section. Further axial movement causes ejection of the capsule section off the pin. When the capsule section is ejected the segments move inwards to engage the pin and the stripper ring can be moved readily to its retracted position by reverse movement. During retraction the radial forces are substantially released so that there is little or substantially no frictional resistance to the ring movement. The capsule section 32 is subsequently trimmed for example at A in FIG. 16, leaving a clean end.

FIGS. 9 to 13 show another embodiment in which a stripper ring 40 has an outer annular ring 41, for example of mild steel or plastics, having tapered inner surface 42 engaging tapered outer surface 43 on inner annular ring 44, for example of bronze. The rings 41, 44 are held together by a spring circlip or clamp 45 received in an outer peripheral groove 46 in ring 44 at the rear of surface 43. The ring 44 has angularly spaced axial slots 46 extending from the front face 47 to beyond the rear of the clamp 45. The clamp has an axial slot and serves to keep the annular inner face 49 of the ring 44, which is nominally parallel to the pin axis, in engagement with pin surface 16, when leading edge 50 of face 49 meets the end of the capsule section the ring 44 is urged outwards by the capsule section and this is resisted by the wedge action between surfaces 42, 43 and the capsule section is ejected as above.

A further preferred embodiment is shown in FIGS. 14 and 15, generally similar to FIGS. 1 to 8 but in this case the outer housing 19 is replaced by an annular spring plate 60, for example of plastics, which has a peripheral portion 61 received in an annular groove 62 in the inner surface of ring 11 which is extended forwards.

FIG. 16 illustrates operation: the pin 17 has rear flange 17a which the segments 14 on ring 44 engage at the start of a cycle. An annular groove 65 is shown in pin stem 17b so the capsule section 32 is a cap section.

The wedge surfaces 12, 13 and 42, 43 may be for example at 30° to the axis but they may be separated by a small amount, for example 1°, as shown exaggerated in FIG. 16 so that the front portion of the inner surfaces of the segments 14 on ring 44 is in firmer contact with the pin surface.

In a modification, instead of being nominally parallel the surfaces 15 are tapered to conform to the taper on the respective pin 17.

The main part of the capsule section is of uniform wall thickness, for example 0.004 inch (0.0094 cm) and the taper on the pin may for example be 0.001 inch in 1 inch (0.0025 cm in 2.54 cm).

FIG. 17 illustrates one method of moving the ring. In a capsule forming machine the pins may be mounted in a rectangular array, one row of pins being stripped at a time.

A ring-moving element 80 may have two parallel flat plates 81, 82 with an intermediate plate 83 disposed to provide a row of recesses 84 so that the element 80 can be raised to receive the rings of a row of pins in the recesses 84, the element 80 then moved forwards to remove the capsule sections 32, moved back to bring the rings to the position shown, and then lowered to release the rings, the row of pins is then replaced by the next row, and so on.

In the examples the gripping effect of the ring at the point of action is provided by the cooperating wedge surfaces of an inner and outer components which produce an inwardly acting, substantially radial, force distributed over the length of the inner surfaces of the inner component (segments or ring 44). The pressure required to strip off a capsule can be varied by altering the angles of the rings and the tension of the spring. The angles are preferable between 15° and 35° to the axis.

The invention includes any novel feature or combination described herein, however defined.

I claim:

1. A stripper ring for a capsule-forming pin comprising inner and outer segmental members having cooperable surfaces shaped so that axial movement of the inner member in one sense relative to the outer member causes radially inwards movement of the inner member, and spring means biasing the inner member radially inwards, the inner member defining an inner surface slidable on the pin and having an end face for engaging a capsule section on the pin during movement of the ring on the pin in the opposite sense.

2. A stripper ring as claimed in claim 1, in which the cooperable surfaces are inclined outwardly as they extend in said opposite sense.

3. A stripper ring as claimed in claim 1 or claim 2, in which the inner member comprises a plurality of angularly spaced separate elements each having an inner surface for engaging the pin.

4. A stripper ring as claimed in claims 1 to 3, in which the spring means comprising an annular plate member engaging with the outer member and adapted to engage said end face of the inner member.

5. A stripper ring as claimed in claim 4, in which the plate member has a peripheral marginal portion engaged in an inwardly facing groove in the outer member.

6. A stripper ring as claimed in claim 4, in which the plate member is shaped to provide a rim surrounding the outer member and engaging an axial end face of the outer member further from said end face of the inner member.

7. A stripper ring as claimed in claim 1 or claim 2, in which the spring means comprises a spring clip embracing the inner member, the inner member having a plurality of angularly spaced axial slots extending from an end face of the inner member, the spring clip being engageable with an end face of the outer member further from said end face of the inner member, said axial slots extending beyond the spring clip.

8. A stripper ring for a capsule-forming pin comprising two parts having segmental cooperable surfaces, one part defining pin receiving bore and slidable on the pin to remove a capsule section from the pin, said cooperable surfaces being shaped to resist radially outwards movement of the one part when the one part engages the capsule section, and spring means urging the one part inwards.

9. A stripper ring as claimed in claim 8, in which the one part comprises a plurality of angularly spaced portions.

* * * * *